(12) United States Patent
Andersson

(10) Patent No.: US 7,686,125 B2
(45) Date of Patent: Mar. 30, 2010

(54) LINEAR ELECTROMECHANICAL ACTUATOR FOR A STEERING SYSTEM OF A MOTOR VEHICLE

(75) Inventor: Per-Erik Andersson, Pinerolo (IT)

(73) Assignee: Aktiebolaget SKF, Goeteborg (SE)

( * ) Notice: Subject to any disclaimer, the term of this patent is extended or adjusted under 35 U.S.C. 154(b) by 312 days.

(21) Appl. No.: 10/592,570

(22) PCT Filed: Mar. 9, 2005

(86) PCT No.: PCT/EP2005/002488

§ 371 (c)(1), (2), (4) Date: Jun. 21, 2007

(87) PCT Pub. No.: WO2005/090144

PCT Pub. Date: Sep. 29, 2005

(65) Prior Publication Data

US 2007/0278031 A1    Dec. 6, 2007

(30) Foreign Application Priority Data

Mar. 15, 2004    (IT) ........................... TO2004A0168

(51) Int. Cl.
*B62D 5/04*    (2006.01)

(52) U.S. Cl. ...................... 180/444; 180/407; 180/428; 74/424.92

(58) Field of Classification Search .................. 180/444, 180/443, 402, 405, 407, 428; 74/424.92
See application file for complete search history.

(56) References Cited

U.S. PATENT DOCUMENTS

| 4,653,602 | A | 3/1987 | Anders et al. | |
|---|---|---|---|---|
| 4,811,813 | A * | 3/1989 | Hovanchak | 180/444 |
| 5,040,631 | A | 8/1991 | Lang et al. | |
| 6,273,210 | B1 * | 8/2001 | Saito et al. | 180/444 |
| 6,552,533 | B2 * | 4/2003 | Schodlbauer et al. | 324/207.22 |
| 6,929,089 | B2 * | 8/2005 | Asada | 180/446 |
| 7,401,677 | B2 * | 7/2008 | Boyle et al. | 180/444 |
| 7,449,878 | B2 * | 11/2008 | Lee | 324/207.23 |
| 2003/0146037 | A1 * | 8/2003 | Menjak et al. | 180/402 |
| 2004/0026158 | A1 * | 2/2004 | Rieth et al. | 180/402 |
| 2006/0266146 | A1 * | 11/2006 | Waide | 74/424.92 |
| 2008/0179971 | A1 * | 7/2008 | Quitmeyer et al. | 310/20 |

FOREIGN PATENT DOCUMENTS

| DE | 74 11 046 U | 6/1977 |
|---|---|---|
| DE | 38 21 501 A1 | 1/1989 |
| DE | 101 08 284 A1 | 10/2001 |
| EP | 0 219 939 A1 | 4/1987 |
| EP | 0 279 034 A1 | 8/1988 |
| EP | 1 010 604 A2 | 6/2000 |

* cited by examiner

*Primary Examiner*—Kevin Hurley
*Assistant Examiner*—Tashiana Adams
(74) *Attorney, Agent, or Firm*—Merchant & Gould P.C.

(57) ABSTRACT

A linear electromechanical actuator, for a steering system of the 'center take-off' type in a motor vehicle comprises: two electric motors each having a stator, and a rotor, a screw mechanism having an axially stationary innerscrew coupled to the rotors of the motor for rotating about an axis, and an outer nut rotationally fixed and axially translatable along the axis, a connection block, axially translatable with the nut, for connecting the nut to two tie rods of the steering system.

16 Claims, 1 Drawing Sheet

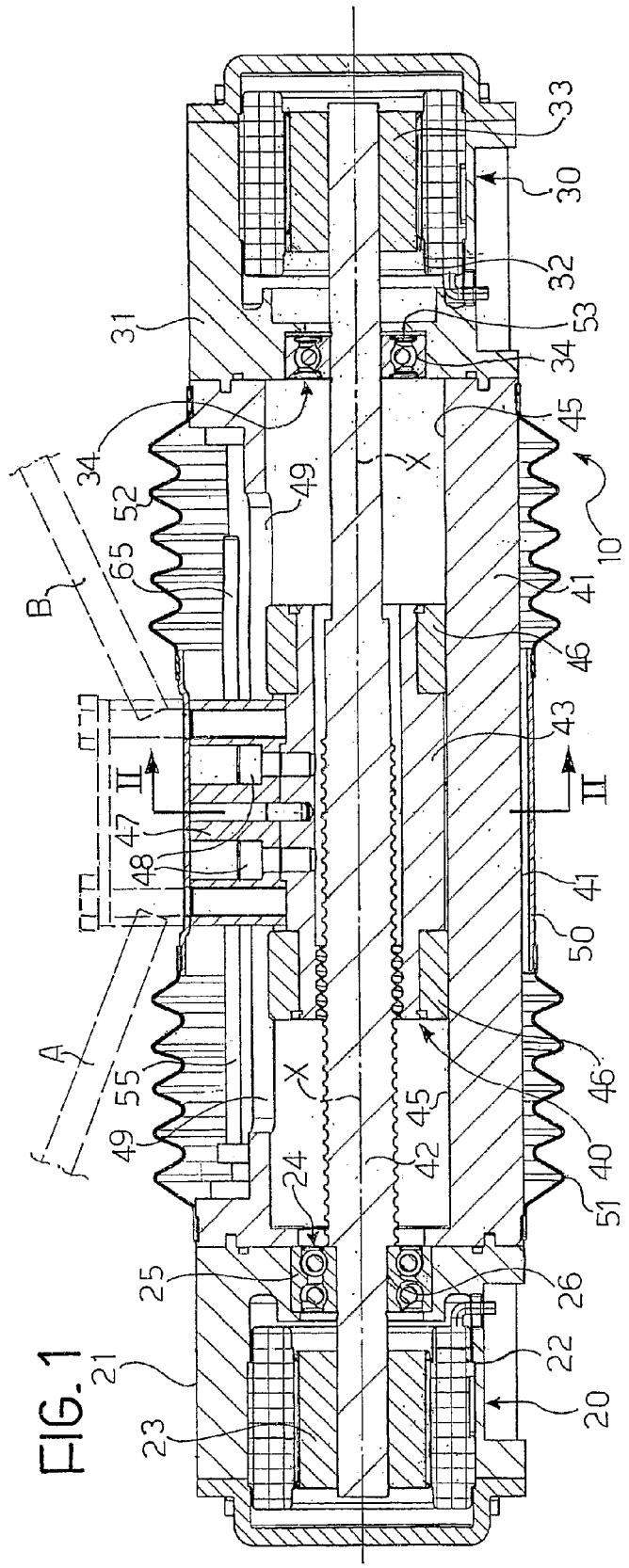
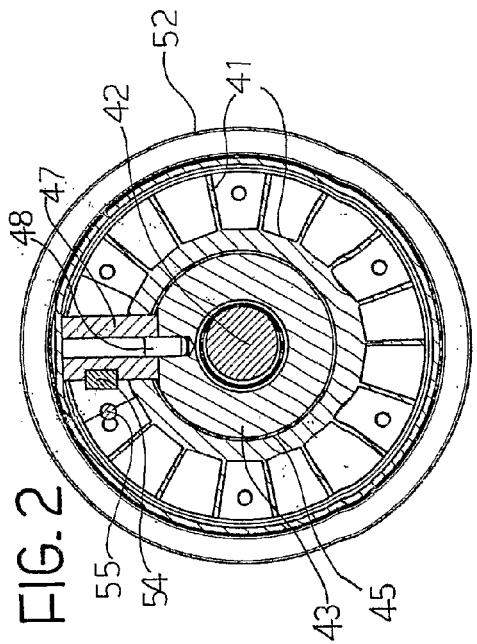

LINEAR ELECTROMECHANICAL ACTUATOR FOR A STEERING SYSTEM OF A MOTOR VEHICLE

BACKGROUND OF THE INVENTION

The present invention refers to a linear electromechanical actuator for a steering system of a motor vehicle in which control movements to the tie rods connected to the steerable wheels are imparted by an electromechanical actuator which replaces the conventional steering column comprised of a mechanical rack and pinion transmission. Particularly, the invention is intended to be used with a steering system of the "center take-off" type, where the tie rods of the steerable wheels are both connected to a transversely mobile control member located in a central position, essentially at the centerline of the vehicle.

There are known power-assisted steering systems which make use of a ballscrew in combination with an electric motor for assisting the conventional (rack and pinion) mechanical transmission system and therefore reducing the effort on the steering wheel for the driver (see, for example, EP-0 219 939-A1 and EP-0 279 034-A1).

SUMMARY OF THE INVENTION

The object of the invention is to provide a reliable linear actuator of compact dimensions for a steering system of the "center take-off" type.

This and other objects and advantages, which will become clearer herein after, are achieved according to the invention by a linear electromechanical actuator as defined in the appended claims.

BRIEF DESCRIPTION OF THE DRAWINGS

A preferred but non-restrictive embodiment will now be described with reference to the appended drawings, in which:

FIG. 1 is an axial sectional view of an actuator according to the invention;

FIG. 2 is radial sectional view taken along the line II-II of FIG. 1.

DETAILED DESCRIPTION OF THE PREFERRED EMBODIMENT(S)

With reference to the drawings, an electromechanical actuator indicated overall 10 is operatively connected to a pair of steerable wheels (not shown) of a motor vehicle through respective tie rods A, B, for imparting thereto control movements along a transversal direction, parallel to the main axis x of the actuator.

Throughout this description and the following claims, terms and expression indicating positions and orientations are to be referred to the assembled condition on a motor vehicle. Accordingly, the expression "transversal" or "axial" indicates a direction perpendicular to the central line of the vehicle or the longitudinal direction of advancement of the vehicle, and the expression "radial" indicates a direction perpendicular to the main axis of the actuator.

The electromechanical actuator 10 comprises two electric motors 20, 30 each mounted at an end portion of a screw mechanism 40 for converting rotary motion of the electric motors into linear motion, parallel to the axis x of the actuator.

Each electric motor comprises a housing 21, 31 fixed to one of the axial end portions of a cylindrical tubular casing 41 of the screw mechanism 40. Each electric motor includes an outer stator 22, 32 and an inner rotor 23, 33 keyed on one of the opposite axial end portions of a rotatable central screw 42 in order to drive the screw for rotation about the transversal axis of rotation x. The screw 42 is axially fixed, being rotatably supported by the electric motor housings 21, 31 through respective rolling bearings 24, 34, one of which is an angular contact bearing 24 with a dual set of balls and having its outer and inner races 25, 26 securely locked axially onto the housing 21 and the screw 42 for withstanding axial loads that, during operation, are transferred from the screw to the fixed parts of the actuator.

The screw mechanism 40 is preferably a ballscrew mechanism including, besides the central rotatable screw 42, an outer nut 43 axially translatable along the transversal axis x. The nut 43 is an elongated tubular member slidable within a cylindrical wall 45 of the casing 41. The nut 43 carries at its axial opposite ends a pair of rings 46 made of a low friction material (such as, for example, Teflon™) in order to facilitate sliding along the inner wall 45 of the casing 41.

A block 47 is fixed from the outside on the central part of the nut, for example by screws 48. The block 47 constitutes the output translating member of the linear actuator, and is connected in known manner to the tie rods A and B. The block 47 projects radially outwardly of a rectilinear axial slit 49 formed in the casing 41. The block 47, being engaged along this slit, prevents the nut from rotating about the translation axis x.

Mounted to the block 47 is an outer sleeve 50 to which two protective bellows 51, 52 are fixed.

Rotational movement of the steering wheel (not shown) is detected by a sensor (not shown) that controls in parallel the two electric motors 20, 30 associated with the screw mechanism 40. Rotational movement of the rotors of the electric motors is converted into translational motion by the ballscrew mechanism, making the nut 43 and the block 47 translate with an axial force of multiplied intensity with respect to the force imparted to the steering wheel.

During operation of the actuator, an incremental rotation sensor 53, which rotates as unit with the screw 42, allows an electronic control unit (not shown) to drive the electromechanical actuator, closing the control loop. Preferably, the rotation sensor 53 is integrated in one (34) of the bearings supporting the screw. A contactless absolute linear sensor is used for initializing the system and represents the back-up solution in the event of a failure of the incremental rotation sensor. The linear sensor comprises a mobile sensor element 54 (FIG. 2) mounted on the translatable block 47 and operatively facing a fixed linear element 55 carried by the casing 41 and extending parallel to the axis of translation x.

As will be appreciated, the invention provides an actuator of the center take-off type for a driven-by-wire vehicle, where a direct mechanical connection between the steering wheel and the steerable wheels has been eliminated. The actuator has an extremely compact design due to the fact that the translatable member is the nut, and not the screw. As a matter of fact, a translatable screw would not allow a central power take-off and would involve a much wider transversal bulk, as in that case the screw should have two opposite end portions, each of a length greater or equal to the linear stroke of the screw, and wherein these end portions should be smooth (not threaded) having to slide in two opposite, smooth supporting bushings.

Reliability of the electromechanical actuator is guaranteed by the two electric motors which, besides increasing safety of the system for redundancy reasons, spread the weight of the actuator equally along the transversal axis x, as they are located at the two opposite ends of the screw mechanism.

Moreover, this separation of the electric motors provides a symmetrical arrangement that turns out to be useful in those cases where there are problems of available space. An arrangement of the two motors one aside the other on a same side of the screw mechanism is less preferable, as it requires more available space at one of the two ends of a screw mechanism fitted centrally on the vehicle.

Finally, the elongated shape of the nut and the low friction rings located at the opposite ends of the nut effectively opposes the torque deriving from the fact that the point of connection of the tie rods to the actuator, and therefore the point of application of the transversal force, is radially spaced from the translation axis x of the nut.

Without departing from the principle of the invention, the embodiments and the details of construction can of course be varied in comparison to what is described and illustrated, without departing from the scope of the present invention.

The invention claimed is:

1. A linear electromechanical actuator for a centered take-off type steering system in a motor vehicle, comprising:
   two electric motors, each of the electric motors having a stator and a rotor;
   a screw mechanism with:
      an axially stationary inner screw coupled to the rotors of the electric motors for rotating about an axis, and
      an outer nut rotationally fixed and axially translatable along said axis;
   connection means, axially translatable with the nut for connecting the nut to two tie rods of the steering system;
   wherein the electric motors are fixed at opposite axial end portions of the screw mechanism, and the rotors of the electric motors are keyed on two respective opposite axial end portions of the screw.

2. The actuator of claim 1, wherein the screw mechanism further comprises a casing forming an axially extended inner cylindrical wall for slidably accommodating the translatable nut.

3. The actuator of claim 2, wherein said connection means projects radially outwardly of a rectilinear axial slit formed by the inner cylindrical wall of the casing.

4. The actuator of claim 3, wherein the connection means is engaged along the rectilinear slit for preventing rotation of the nut about the translation axis.

5. The actuator of claim 1, wherein the screw mechanism is a ballscrew mechanism.

6. The actuator of claim 2, wherein the nut is an elongated tubular member with opposite end portions each provided with an element of a low friction material slidingly contacting the inner cylindrical wall of the casing.

7. The actuator of claim 6, wherein the low friction elements are annular cylindrical elements.

8. The actuator of claim 1, wherein the two electric motors are fixed symmetrically to the opposite axial end portions of the screw mechanism.

9. The actuator of claim 1, further comprising at least one rotation sensor operatively associated with the screw.

10. The actuator of claim 9, wherein the rotation sensor is fitted near a bearing for rotatably supporting the screw about the axis.

11. The actuator of claim 9, wherein the rotation sensor is integrated in a bearing for rotatably supporting the screw about the axis.

12. The actuator of claim 1, wherein the screw is rotatably supported by two axially spaced rolling bearings, wherein one of said bearings is an angular contact bearing with a dual set of balls having an outer race and an inner race axially locked with respect to a casing and the screw, respectively.

13. The actuator of claim 1, further comprising an absolute linear sensor device for detecting the axial position of the nut along the axis.

14. The actuator of claim 13, wherein the linear sensor device includes a fixed linear element carried by the casing and extending parallel to the translation axis.

15. The actuator of claim 14, wherein the linear sensor device includes a mobile sensor element mounted on said connection means and operatively facing the fixed linear sensor element.

16. The actuator of claim 13, wherein the linear sensor device comprises a contactless type sensor.

* * * * *